United States Patent [19]
Naylor et al.

[11] Patent Number: 4,828,757
[45] Date of Patent: * May 9, 1989

[54] LIQUID CLEANING COMPOSITIONS CONTAINING POLYETHER AMIDE SURFACTANTS AS THICKENING AGENTS

[75] Inventors: Carter G. Naylor, Austin; Jiang-Jen Lin, Round Rock; George P. Speranza, Austin, all of Tex.

[73] Assignee: Texaco Chemical Company, White Plains, N.Y.

[*] Notice: The portion of the term of this patent subsequent to Jan. 3, 2006 has been disclaimed.

[21] Appl. No.: 168,024

[22] Filed: Mar. 14, 1988

[51] Int. Cl.$^4$ .............. C11D 1/831; C11D 3/02; C11D 3/32; C11D 17/08
[52] U.S. Cl. .............. 252/544; 252/89.1; 252/173; 252/174.21; 252/551; 252/555; 252/558; 252/559; 252/DIG. 1; 252/DIG. 14
[58] Field of Search .............. 252/110, 117, 525, 529, 252/544, 548, 174.21, 174.22, 355, 357, DIG. 13, DIG. 14, 173, 550, 557, 555, 558, 559, DIG. 1, 89.1

[56] References Cited

U.S. PATENT DOCUMENTS

| 3,962,418 | 6/1976 | Birkofer | 424/70 |
| 4,375,421 | 3/1983 | Rubin | 252/110 |
| 4,398,045 | 8/1983 | Sebag | 568/624 |
| 4,450,090 | 5/1984 | Kinney | 252/106 |
| 4,744,924 | 5/1988 | Hensen | 252/551 |

Primary Examiner—Dennis Albrecht
Attorney, Agent, or Firm—Jack H. Park; Kenneth R. Priem; Cynthia L. Kendrick

[57] ABSTRACT

A method of thickening an aqueous solution containing from 5 to 50 wt% of a surfactant is disclosed comprising the addition of from about 0.1 to 10 wt% to the solution of a polyether amide derivative having the general formula:

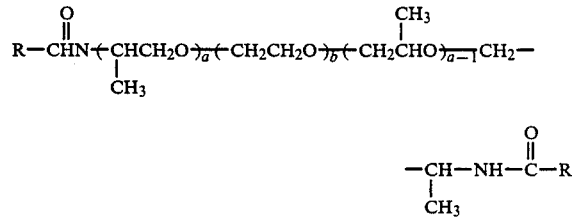

wherein $R = C_9 - C_{23}$ and $a = 1$ to about 5 and $b = 1$ to 500.

20 Claims, No Drawings 4,828,757

LIQUID CLEANING COMPOSITIONS CONTAINING POLYETHER AMIDE SURFACTANTS AS THICKENING AGENTS

BACKGROUND OF THE INVENTION

1. Field of the Invention

This invention relates to fatty amide derivatives. More particularly, this invention relates to novel polyether amide derivatives derived from water-soluble polyether amines and fatty acids and especially to their use as viscosity enhancing agents in liquid cleaning compositions. Excellent properties are exhibited with these products and compositions are provided which should be useful in a number of applications such as liquid skin cleansers, liquid soaps, liquid laundry detergents, and blends of nonionic, anionic, and/or cationic surfactants or nonionic surfactants alone.

The polyether amides of this invention are prepared by reacting equivalent amounts of water-soluble polyether amines with fatty acids. Suitable fatty acids include those which are common, inexpensive and fairly easy to obtain, such as oleic, tallow, tall and coconut. The reaction to produce the polyether amides is preferably conducted under vacuum at a temperature within the range of about 100° C. to about 300° C. and preferably above 150° C.

2. Description of the Related Art

There are a variety of methods known to thicken compositions containing anionic surfactants. See *Surfactants in Cosmetics*, Vol. 16 of Surfactant Science Series, M. M. Rieger, Ed., Marcel Dekker 1985, Chap. 9, pp. 251-292, for a discussion of related topics.

Articles by P. Alexander on "Rheological Additives" in *Mfg. Chemist and Aersol News*, May 1986, p. 71 and June 1986, p. 49 provide a good overview of many of the rheological materials available to affect viscosity in personal care products. These materials include inorganic thickening agents, various mineral and clay substances, mastergels, synthetic materials which have improved characteristics over swelling clays, gel systems, pyrogenic silicas, polar and non-polar media and other silicas.

An overview of the chemistry of detergent-softener formulations containing a nonionic detergent and cationic fabric softener, and optional ingredients can be found in the Sherex Technical Bulletin "Formulating Liquid Detergent-Softeners" (1983).

Other possible formulations for nonionic detergents, fabric softeners and optional ingredients can be reviewed in Armak Technical Bulletin No. 82-16 "Formulating Liquid Detergent/Softener/Antistatic Products with Armosoft ® WA Bases" (1982).

Some aspects of detergent properties of nonionic and cationic surfactant formulations are presented in Texaco Chemical Company Technical Applications Bulletin (1984) "Liquid Detergent-Softener Formulations With Surfonic ® N Nonionic Surfactants"

U.S. Pat. No. 3,954,660 to Kennedy, et al. proposes increasing the viscosity of anionic surfactant slurries by admixing with such slurries an effective amount of an additive selected from the group consisting of dialkyl ethers, alkoxyethoxyethanols and tertiary amines having the general formula $R_3N$, wherein R is an alkyl group containing from 2 to 4 carbon atoms.

Polymeric thickeners are known to capitalize on the hydration and swelling properties of high molecular weight polymers and the chain extension and hydrogen bonding of polymer units to achieve an increase in viscosity. European Pat. Nos. 132,961 and 133,345 disclose liquid soap compositions containing a water-soluble polymer selected from the group consisting of hydroxyethyl cellulose and hydroxypropyl guar. A quaternary nitrogen-containing cellulose ether thickening agent is disclosed as useful in the production of mild thickened liquid shampoo compositions in U.S. Pat. No. 3,962,418 to Birkofer.

Electrolytes such as sodium and ammonium chloride are known to raise the viscosity of surfactant formulations by increasing the size of the surfactant micelles. Long-chain lipophiles having a hydrophilic end-group such as alkanolamides, betaines and amine oxides are also known to increase viscosity by enlarging micelles.

U.S. Pat. No. 4,375,421 to Rubin, et al. discloses solutions containing alkylamido betaines and certain water-soluble inorganic and organic salts. These salts have a viscosity-building effect on aqueous compositions containing alkylamido betaines in the presence of anionic surfactants.

U.S. Pat. No. 4,490,355 to Desai teaches that a mixture of cocoamidopropyl betaine and oleamidopropyl betaine improves the thickening and foam boosting properties in hair and skin care formulations.

The viscosity enhancing effect of different amides on a 15% active monoethanolamine-lauryl sulfate and a 15% active sodium laureth-2 sulfate has been reported. B. R. Donaldson and E. T. Messenger, Int. J. Cosm. Sci. 1:71-90 (1979). In a different report, cocamide MEA was found to be an effective thickener, G. Felletschin, Tenside Detergents 7:16-18 (1970). Further, U. K. Patent Application No. GB 2 143 841A discloses the use of a variety of thickeners, including long-chain ($C_{12}$–$C_{18}$) fatty acid amides, in thickened aqueous surfactant compositions.

It has also been proposed to thicken shampoos by combining two surfactants, one being a nonionic surfactant typified by dibasic and tribasic acid reaction products of alkoxylated polyol fatty esters and another being of a different type such as an amphoteric/anionic surfactant. U.S. Pat. No. 4,261,851 to Duke reports that the nonionic surfactant has a thickening effect on the composition.

A composition which exhibits improved viscosity enhancing properties over related compositions and which exhibits improved properties over conventional ethanolamides would be a desirable advance in the art.

Applicant has discovered that polyether amide derivatives made from water-soluble polyether amines and fatty acids exhibit outstanding properties compared with conventional ethanolamines in thickening and in compatibility with anionic surfactants. They also exhibit improved phase stability.

The fatty amides are preferably prepared from JEF-FAMINE ® ED-series amines and fatty acids or triglycerides or simple fatty esters such as tallow, oleic, tall oil, coconut, palm or linoleic.

SUMMARY OF THE INVENTION

The invention is a composition of matter and a method for thickening an aqueous solution containing an anionic surfactant selected from the group consisting of alkyl sulfates, alkyl ether sulfates, alkyl benzene sulfonates and olefin sulfonates or nonionic surfactants, comprising the addition to the solution of a polyether amide having the general formula:

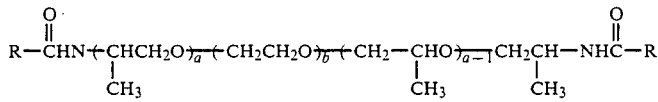

wherein R=C₉–C₂₃, a=1 to 5 to about 10 and b=1 to 500, formed by combining polyether amines and common fatty acids.

DESCRIPTION OF THE PREFERRED EMBODIMENTS

Fatty amide derivatives of water-soluble JEFFAMINE ® amines have been found effective thickeners for anionic and nonionic surfactants in aqueous solution. The thickened blends are suitable for use in hair and body shampoos, pet shampoos, skin cleansers and liquid laundry detergents. The polyether amides of this invention display superiority over thickening agents most commonly used in such compositions, giving blends with much higher viscosities.

The polyether amide derivatives used to thicken these compositions have the following general formula:

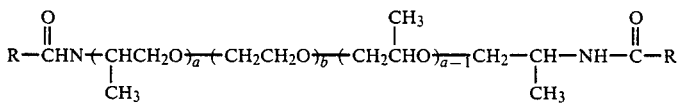

wherein R is a hydrocarbon group containing from 10–20 carbon atoms, preferably from 11–17 carbon atoms, and a=1 to 5 and b=20–1000. It is also preferred that the amount of the polyether amide derivative present in the composition is from about 1 to about 25 wt. % of the total active ingredients. It is especially preferred that the amount of polyether amide derivative present is from about 0.5 to about 5 wt. % of the thickened composition.

The polyether amide derivatives are prepared by reacting the polyoxyalkylene amines with common fatty acids, such as tallow, oleic, tall and coconut. The amines to be used in the invention include diamines or higher amines with water-soluble polyether backbones and a molecular weight of ≧600.

Suitable amines include polyoxyalkylene diamines containing both ethylene oxide and propylene oxide which are sold by Texaco Chemical Company as JEFFAMINE ® ED-series products having the general formula:

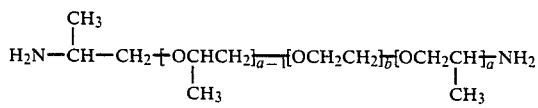

wherein a equals a number having a value of from about 1 to about 5 and b is a number having a value of from about 1 to about 500.

Examples of products having this general formula include a commercial product having an average molecular weight of about 600 where the value of b is about 8.5 and the value of a is about 1.3 (JEFFAMINE ® ED-600) and a commercial product having an average molecular weight of about 900 wherein the value of a is, again, about 1.2, but the value of b is about 15.5 (JEFFAMINE ® ED-900). Other examples are those wherein a has a value of about 1.3 including a product having an average molecular weight of about 2000 wherein the value of b is about 40 (JEFFAMINE ® ED-2001) and a product having an average molecular weight of about 4000 wherein the value of b is about 85 (JEFFAMINE ® ED-4000).

Examples 4 and 8 through 11, especially, demonstrate a distinct improvement over comparable commercial products with regard to the properties of compatibility, thickening ability and phase stability when employing the dioleamide of JEFFAMINE ® ED-2001.

The acids suitable for preparing the fatty amide derivatives are fatty acids including, but not limited to oleic, stearic, linoleic, tallow, tall and coconut.

The amides may also be prepared directly from triglycerides and amines or from simple fatty esters and amines.

Suitable anionic surfactants include alkyl sulfates, alkyl ether sulfates, alkyl benzene sulfonates and olefin sulfonates. It is preferred that the anionic surfactant is an alpha olefin sulfonate containing from 10 to 16 carbon atoms, or a mixture thereof. Further, a portion of the anionic surfactant may be replaced with a combination of anionic, amphoteric and nonionic surfactants.

Suitable nonionic surfactants include alkyl phenol ethoxylates and aliphatic alcohol ethoxylates. The art indicates alkyl phenol ethoxylates are often preferred. Examples include, for example, ethoxylated nonylphenols from Texaco Chemical Company which are known by the tradename SURFONIC ® N-85 and SURFONIC N-95.

SURFONIC ® Surface Active Agents can be represented by the formula:

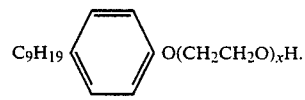

The SURFONIC ® products are designated by a number following the letter "N". The number is a tenfold multiple of the molar ratio (x) of ethylene oxide in the adduct.

Examples of ethoxylated alcohols include NEODOL ® 25-7 and NEODOL ® 25-9 from Shell Chemical Company.

In addition to the components mentioned, the composition may also contain conventional additives such as lathering agents, opacifying agents, conditioning agents, chelating agents, stabilizers, preservatives, colorants, fragrances and other additives known in the art and discussed in, for example, the Armak and Sherex bulletins noted above.

The concentrations of the principal ingredients of this invention may vary. The concentration of the anionic or nonionic surfactant is preferably from about 5 to about 50 wt. % of the thickened composition. The preferred weight percent is 5–15%. Water is typically the vehicle for liquid based formulations and preferably is present up to about 90 wt. %. Further, it is preferable that an inorganic salt (sodium chloride is especially preferred) be present, up to about 5 wt. %, to aid thickening.

The fatty amine derivative products formed are waxy solids.

The following non-limited examples illustrate the preparation of the fatty amide derivatives and demonstrate the utility of the compositions.

Example I demonstrates the preparation of several different fatty amide derivatives from JEFFAMINE ® ED-series amines and commonly available fatty acids.

EXAMPLE 1

Preparation of Fatty Amides from JEFFAMINE AMINES

General Procedure

Equivalent amounts of JEFFAMINE ® ED diamine and fatty acid were heated under vacuum at 180°–220° C. for several hours. The products were waxy solids, off-white to brown in color. The table contains data describing their water-solubility and surface activity.

| Sample No. | Fatty Acid | JEFFAMINE ® ED Amine | Cloud Pt., 10% Aq., °C. | Tension, dynes/cm 0.1%, @ 25° C. Surface | Interfacial |
|---|---|---|---|---|---|
| 1a | Oleic | ED-2001 | 55 | 39.5 | 10.7 |
| 1b | Stearic | ED-2001 | 67 (Clear Pt. 40°) | | |
| 1c | Oleic | ED-6000 | 93 | 41.6 | 12.3 |
| 1d | Oleic | ED-600 | <0 | | |
| 1e | Coconut | ED-600 | <0 | | |
| 1f | Oleic | ED-4000 | | | |

EXAMPLE 2

Two series of three aqueous solutions of nonionic surfactant and the distearamide of ED-2001 were prepared and examined qualitatively for thickening effects. The samples of Example 2 demonstrated the thickening properties of the ED-amines.

| Sample No. | Nonionic | Wt. % | Wt. % Diamide | Observations |
|---|---|---|---|---|
| 2a | NEODOL 25-7 | 15 | 0 | Viscosity increases in order |
| 2b | | 13.5 | 1.5 | 2a < 2b < 2c |
| 2c | | 12 | 3 | |
| 2d | SURFONIC N-95 | 10 | 0 | Viscosity increases in order |
| 2e | | 9 | 1 | 2d < 2e < 2f |
| 2f | | 8 | 2 | |

In Example 3 the properties of several liquid detergent formulations containing amides of this invention are examined and compared. All have 5% alkyl benzene sulfonate.

The liquid detergent formulations of Example 3 display high viscosity while total surfactant concentration is only 15%. The ED amides have superior compatibility and viscosity building properties compared to DEA cocoamide.

EXAMPLE 3

| Nonionic | Wt % | Amide | Wt % | Clear Pt. | Viscosity @ 25° | Clear Pt. with 2% KCl | Viscosity at 25° C. |
|---|---|---|---|---|---|---|---|
| NEODOL 25-7 | 10 | ED-2001 Distearamide | 0 | <0° C. | 12.5 cps | 23° C. | 116 cps |
| | 8 | ED-2001 Distearamide | 2 | <0 | 44.5 | 18 | 457 |
| | 8 | ED-2001 Dioleamide | 2 | <0 | 60.5 | 14 | 350 |
| | 8 | Coconut diethanolamide | 2 | 4 | 20.5 | 43 | — |
| SURFONIC N-95 | 10 | ED-2001 Distearamide | 0 | <0 | 27.5 | 21 | — |
| | 9 | ED-2001 Distearamide | 1 | 2 | 50.5 | 17 | 134 |
| | 9 | Coconut diethanolamide | 1 | <0 | 32 | >25 | — |

The data of Example 4 show that ED-2001 diamide is the most effective viscosity builder of the ED-series. All are superior to DEA amide and a betaine thickener. The latter has the poorest compatibility as indicated by its high clear point values. All the liquid detergent formulations of Example 4 contained 5% alkyl benzene sulfonate, 2% triethanolamine.

EXAMPLE 4

| Nonionic | Wt % | Amide | Wt % | Wt % KCl | Clear Pt., °C. | Viscosity @ 25° C. |
|---|---|---|---|---|---|---|
| SURFONIC N-95 | 10 | None | — | 1 | <0 | 524 cps |
| | 9 | ED-600 Dioleamide | 1 | 1 | <0 | 258 |
| | 9 | ED-2001 Dioleamide | 1 | 1 | <0 | 375 |
| | 9 | ED-4000 Dioleamide | 1 | 1 | <0 | 308 |
| | 9 | Coconut Diethanolamide | 1 | 1 | <0 | 196 |
| | 9 | ED-6000 Dioleamide | 1 | 1 | <0 | 268 |
| | 9 | Betaine (VARION TEG) | 1 | 1 | 21 | 122 |
| | 8 | ED-2001 Dioleamide | 2 | 1 | <0 | 240 |
| NEODOL 25-7 | 10 | NONE | — | 1 | 8 | 312 |
| | 9 | ED-600 Dioleamide | 1 | 1 | 8 | 330 |
| | 9 | ED-2001 Dioleamide | 1 | 1 | 18 | 920 |
| | 9 | ED-4000 Dioleamide | 1 | 1 | 16 | 883 |
| | 9 | ED-6000 Dioleamide | 1 | 1 | 12 | 540 |
| | 9 | Coconut Diethanolamide | 1 | 1 | 9 | 314 |

EXAMPLE 4-continued

| Nonionic Wt % | Amide | Wt % | Wt % KCl | Clear Pt., °C. | Viscosity @ 25° C. |
|---|---|---|---|---|---|
| 9 | Betaine (VARION TEG) | 1 | 1 | 31 | — |
| 8 | ED-2001 Dioleamide | 2 | 1 | 22 | 1540 |
| 10 | None | — | 2 | 22 | 118 |
| 9 | ED-2001 Dioleamide | 1 | 2 | 11 | 191 |
| 8 | ED-2001 Dioleamide | 2 | 2 | 12 | 358 |

EXAMPLE 5

JEFFAMINE ED-2001 distearamide (from Example 1) was blended at three levels with three of the most common anionic surfactants used in detergents and personal care cleaners. The solutions were examined qualitatively for thickening effects.

The results proved the thickening effect of the ED diamides on anionics.

| Sample No. | Anionic | Wt % | Wt % Diamide | Observations |
|---|---|---|---|---|
| 5a | LAS (WITCONATE | 15 | 0 | Viscosity |
| 5b | 1250, alkylben- | 13.5 | 1.5 | increases in |
| 5c | zenesulfonate) | 12 | 3 | order 5a < 5b < 5c |
| 5d | AOS (WITCONATE AOS, | 15 | 0 | 5d < 5e < 5f |
| 5e | alpha olefin | 13.5 | 1.5 | |
| 5f | sulfonate ) | 12 | 3 | |
| 5g | AES (WITCONATE | 15 | 0 | 5g < 5h < 5i |
| 5h | SE-5, alkyl ether | 13.5 | 1.5 | |
| 5i | sulfate) | 12 | 3 | |

Example 6 demonstrates the thickening of surfactant solutions using the amides of this invention. NaCl was added in the amount of 2%.

EXAMPLE 6

| Anionic Surfactant | wt % | Thickener | wt % | Clear Pt. | Viscosity @ 25° C. |
|---|---|---|---|---|---|
| LAS | 15 | ED-2001 Dioleamide | 3 | 20° C. | 206 cps |
| | | ED-4000 Dioleamide | 3 | 21 | 146 |
| | | ED-6000 Dioleamide | 3 | 19 | 124 |
| | | DEA Cocoamide | 3 | 40 | Insoluble |
| AOS | 15 | ED-2001 Dioleamide | 5 | 22 | 1240 |
| | | ED-4000 Dioleamide | 5 | 20 | 546 |
| | | ED-6000 Dioleamide | 5 | 15 | 22 |
| | | DEA Cocoamide | 5 | 10 | 100 |

ED-2001 dioleamide is the best of the three amides of this series for thickening of LAS and AOS. DEA cocoamide is incompatible with LAS; with AOS it has better compatibility than the ED-series amides, but is a weaker thickener than ED-2001 and ED-4000 amides.

Example 7 demonstrates the thickening effect of ED-2001 amides with three widely noted anionic surfactants. The betaine thickener is compatible with LAS and AOS. The DEA cocoamide is ineffective for thickening AOS.

EXAMPLE 7

| Anionic Surfactant, 15 wt % | Thickener | wt % | Viscosity @ 25° C. | Viscosity in 2% NaCl @ 25° C. |
|---|---|---|---|---|
| LAS (WITCONATE 1250) | None | — | 7 cps | — |
| | ED-2001 Distearamide | 6 | 34 | 242 |
| | ED-2001 Dioleamide | 6 | 69 | — |
| | Betaine (VARION TEG) | 6 | Insoluble | — |
| AOS (WITCONATE AOS) | None | — | 4 | Insoluble |
| | ED-2000 Distearamide | 6 | 8430 | — |
| | ED-2000 Distearamide | 4.5 | 22 | 161 |
| | ED-2001 Dioleamide | 6 | 3600 | — |
| | ED-2001 Dioleamide | | | |
| | DEA Cocoamide (WITCAMIDE 82) | 6 | 10 | Insoluble |
| | VARION TEG | 6 | Insoluble | — |
| AES (WITCOLATE SE-5) | None | — | 6 | — |
| | ED-2001 Distearamide | 6 | 56400 | Insoluble |
| | ED-2001 Distearamide | 3 | 120 | 857 |
| | ED-2001 Dioleamide | 3 | 133 | — |
| | ED-2001 Dioleamide | 4.5 | 2545 | — |

EXAMPLES 8

Dilute liquid detergent-softener formulations were prepared and examined for clear or gel point (low temperature limit of compatibility or flowability) and viscosity. All contained 12 wt % NEODOL ® 25-7 nonionic surfactant, 4% ARMOSOFT WA-104 cationic surfactant, 3% triethanolamine, 4% ethanol and varying amounts of the dioleamide of JEFFAMINE ® ED-2001.

ARMOSOFT ® WA is the tradename for softener-antistatic bases from AKZO Chemie America which are specifically designed to be incorporated into liquid detergent/softener/antistatic (LDSA) laundry products. They are quaternary ammonium salts and are discussed above in the AKZO bulletin reference.

| Wt % Diamide | Clear/Gel Point, °C. | Viscosity @ 25° C., cps |
|---|---|---|
| 0 | <0 | 16 |
| 1 | <0 | 95 |
| 2 | <0 | 388 |
| 3 | <0 | 905 |

The compatibility and thickening ability of the di-oleamide are clearly demonstrated by these data.

EXAMPLE 9

Detergent-softener blends were prepared comparing the ED-2001 dioleamide used in Example 8 with two commercial thickener surfactants. All contained 12% NEODOL 25-7, 4% ARMOSOFT WA-104, 3% TEA and 3% ethanol.

| Thickener | Wt % | Clear/Gel Point, °C. | Cloud Point, °C. | Viscosity @ 25° C., cps |
|---|---|---|---|---|
| None | — | <0 | >100 | 19 |
| Cocoamide DEA (WITCAMIDE ® 82) | 2 | 12 | >100 | 104 |
| Tallow-diethanolamine Betaine (VARION ® TEG) | 2 | 16 | 81 | 472 |
| ED-2001 Dioleamide | 2 | <0 | >100 | 658 |

The dioleamide has compatibility and thickening power superior to the commercial products.

EXAMPLE 10

Formulations of detergent-softeners analogous to those of the previous examples, differing only in the cationic surfactant and ethanol level, were prepared. The cationic was VARISOFT ® 3690, 4 wt %; ethanol concentration was 2%. VARISOFT ® 3690 is a fabric softener concentrate from Sherex which contains 75% methyl-1-oleyl amido ethyl-2-oleyl imidazolonium methylsulfate.

| Thickener | Wt % | Clear/Gel Point, °C. | Cloud Point, °C. | Viscosity @ 25° C., cps |
|---|---|---|---|---|
| None | — | <0 | 33 | 545 |
| ED-2001 Dioleamide | 1 | <0 | 40 | 1140 |
|  | 2 | <0 | 52 | 2020 |
|  | 3 | <0 | 23 | 3040 |
| Cocoamide DEA | 2 | <0 | 17 | — |
| Tallow-DEA Betaine | 2 | <100 | — | — |

Again, the superiority of the dioleamide in compatibility was demonstrated. Viscosity of the reference formulations could not be determined because they were phase unstable at 25°.

EXAMPLE 11

The beneficial influence on phase stability is illustrated for ED-2001 dioleamide by these data. The formulations are the same as in Example 10.

| Wt % Diamide | Wt % Ethanol | Clear/Gel Point, °C. | Cloud Point, °C. | Viscosity @ 25° C., cps |
|---|---|---|---|---|
| 0 | 2 | <0 | 33 | 545 |
| 1 | 2 | <0 | 40 | 1372 |
| 0 | 4 | <0 | 73 | 220 |
| 1 | 4 | <0 | 100 | 730 |

Formulations of household laundry detergents such as these detergent softeners should have clear/gel points below 10° C., preferably below 5° C., and cloud points above 60° C. The diamide raised cloud points as well as viscosity, so that less ethanol is needed to achieve a given cloud point.

What is claimed is:

1. A method of thickening an aqueous solution containing
   from about 5 to 50 wt % of a surfactant selected from the group consisting of anionic or nonionic surfactants; 0 wt % to about 5 wt % inorganic salt, comprising sodium or potassium chloride, and
   up to about 90 wt % water,
   comprising the addition of from about 0.1 to about 10 wt % to the solution of a polyether amide having the general formula:

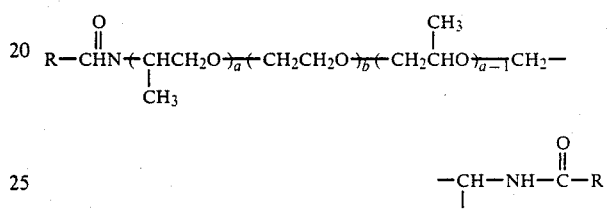

wherein $R = C_9-C_{23}$ linear saturated or unsaturated, $a = 1$ to about 5, and $b = 1$ to 500.

2. The method of claim 1 wherein the surfactant is anionic and is selected from the group consisting of alkyl sulfates, alkyl ether sulfates, and alkyl benzene sulfonates and wherein the alkyl groups contain 6 to 18 carbons, and olefin sulfonates wherein the olefin group contains 12 to 18 carbons.

3. The method of claim 1 wherein the surfactant is nonionic and is selected from the group consisting of alkyl phenol ethoxylates and aliphatic alcohol ethoxylates.

4. The method of claim 3 wherein the alkyl phenol ethoxylate is an ethoxylated nonylphenol of the formula:

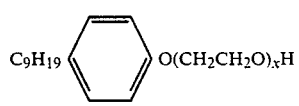

where $x =$ about 8 to about 12.

5. A thickened composition comprising
   a. from about 5 to about 50 wt % a surfactant selected from the group consisting of anionic or nonionic surfactants;
   b. 0 wt % to about 5 wt % an inorganic salt;
   c. up wt % to about 90 wt % water; and
   d. as an essential ingredient, from about 1 to 25 wt % of the total active ingredients a polyether amide having the general formula:

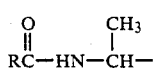

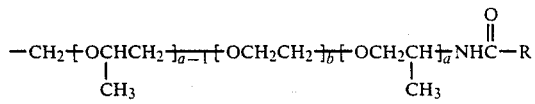

wherein $R=C_{10}-C_{18}$ and $a=1$ to about 5 amd $b=1-500$.

6. The composition of claim 5 wherein the surfactant is anionic and is selected from the group consisting of alkyl sulfates, alkyl ether sulfates, and alkyl benzene sulfonates and wherein the alkyl groups contain 6 to 18 carbons, and olefin sulfonates wherein the olefin group contains 12 to 18 carbons.

7. The composition of claim 5 wherein the surfactant is nonionic and is selected from the group consisting of alkyl phenol ethoxylates and aliphatic alcohol ethoxylates.

8. The composition of claim 7 wherein the alkyl phenol ethoxylate is an ethoxylated nonylphenol of the formula:

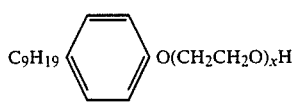

where $x=$ about 8 to about 12.

9. The thickened composition of claim 5 wherein the polyether amide is the product of the reaction of equivalent amounts of water-soluble polyoxyalkylene diamines and fatty acids.

10. The thickened composition of claim 9 wherein the amine reactants are diamines or higher amines with water-soluble polyether backbones having a molecular weight greater than or equal to 600.

11. The thickened composition of claim 9 wherein the polyoxyalkylene diamines are of the formula:

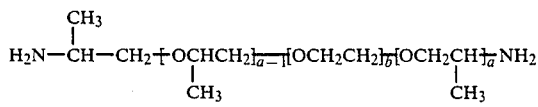

wherein $a+c$ equals a number having a value of from about 1 to about 5 and b is a number having a value of from about 1 to about 500.

12. The thickened composition of claim 11 wherein the polyoxyalkylene diamine is selected from the group consisting of polyoxyethylene diamines and polyoxypropylene diamines.

13. The thickened composition of claim 12 wherein the polyoxyalkylene diamine is selected from the group consisting of polyoxyethylene diamines and polyoxypropylene diamines wherein the molecular weight is 600 to 6000.

14. The thickened composition of claim 11 wherein the polyoxyalkylene diamine has a molecular weight of about 600 and the value of b is about 8.5 and the value of a is about 1.25.

15. The thickened composition of claim 11 wherein the polyoxyalkylene diamine has a molecular weight of about 900 wherein the value of a is about 1.25 and the value of b is about 15.5.

16. The thickened composition of claim 11 wherein the polyoxyalkylene diamine has a molecular weight of about 2000 wherein the value of a is about 1.25 and the value of b is about 40.

17. The thickened composition of claim 11 wherein the polyoxyalkylene diamine has a molecular weight of about 4000 wherein a is about 1.25 and the value of b is about 85.

18. The thickened composition of claim 5 wherein the fatty acids are selected from the group consisting of tallow, stearic, oleic, tall and coconut.

19. The thickened composition of claim 5 wherein the polyether amide is the product of the reaction of equivalent amounts of amines and triglycerides.

20. The thickened composition of claim 5 wherein the polyether amide is the product of the reaction of equivalent amounts of water-soluble polyoxyalkylene diamines and fatty esters.

* * * * *